(12) United States Patent
Yamamoto et al.

(10) Patent No.: US 7,167,273 B2
(45) Date of Patent: Jan. 23, 2007

(54) IMAGE PROCESSING APPARATUS AND METHOD CAPABLE OF ELIMINATING IMAGE CONTOUR DISTORTION

(75) Inventors: Toshitsugu Yamamoto, Takatsuki (JP); Satoshi Deishi, Ibaraki (JP); Masahiro Hayakawa, Amagasaki (JP); Seiji Ohshima, Itami (JP)

(73) Assignee: Minolta Co., Ltd., Osaka (JP)

( * ) Notice: Subject to any disclaimer, the term of this patent is extended or adjusted under 35 U.S.C. 154(b) by 837 days.

(21) Appl. No.: 09/860,434

(22) Filed: May 21, 2001

(65) Prior Publication Data

US 2001/0046058 A1    Nov. 29, 2001

(30) Foreign Application Priority Data

May 25, 2000    (JP)    ............................. 2000-154316

(51) Int. Cl.
*H04N 1/405*    (2006.01)
(52) U.S. Cl. ........................................ 358/1.9; 358/3.14
(58) Field of Classification Search .................. 358/1.9, 358/2.1, 3.13–3.15, 3.24, 3.27, 3.2; 382/199, 382/266–269
See application file for complete search history.

(56) References Cited

U.S. PATENT DOCUMENTS

| 6,163,629 | A  | * | 12/2000 | Cheung et al. ............. 382/260 |
| 6,459,502 | B1 | * | 10/2002 | Takamatsu et al. .......... 358/1.9 |
| 6,597,472 | B1 | * | 7/2003  | Suzuki et al. ................ 358/1.9 |
| 6,798,537 | B1 | * | 9/2004  | Lau et al. ..................... 358/1.9 |
| 6,977,757 | B1 | * | 12/2005 | Takahashi et al. ......... 358/3.05 |
| 2001/0021034 | A1 | * | 9/2001  | Suzuki et al. ................ 358/1.9 |
| 2001/0050778 | A1 | * | 12/2001 | Fukuda et al. ............... 358/1.9 |

FOREIGN PATENT DOCUMENTS

JP    05-037767    2/1993

* cited by examiner

*Primary Examiner*—Thomas D. Lee
*Assistant Examiner*—Stephen Brinich
(74) *Attorney, Agent, or Firm*—Buchanan Ingersoll & Rooney PC

(57) ABSTRACT

An image processing apparatus providing a halftoning process such as error diffusion prevents an image contour distortion, as follows: data in an image to be processed is used to partially extend the image to be processed. Then error diffusion or the like is employed to provide a halftoning process. The extension is removed to obtain image data. A dot generation delay can be prevented that would otherwise be introduced such as when an extension-free image is halftoned.

22 Claims, 13 Drawing Sheets

F I G. 2
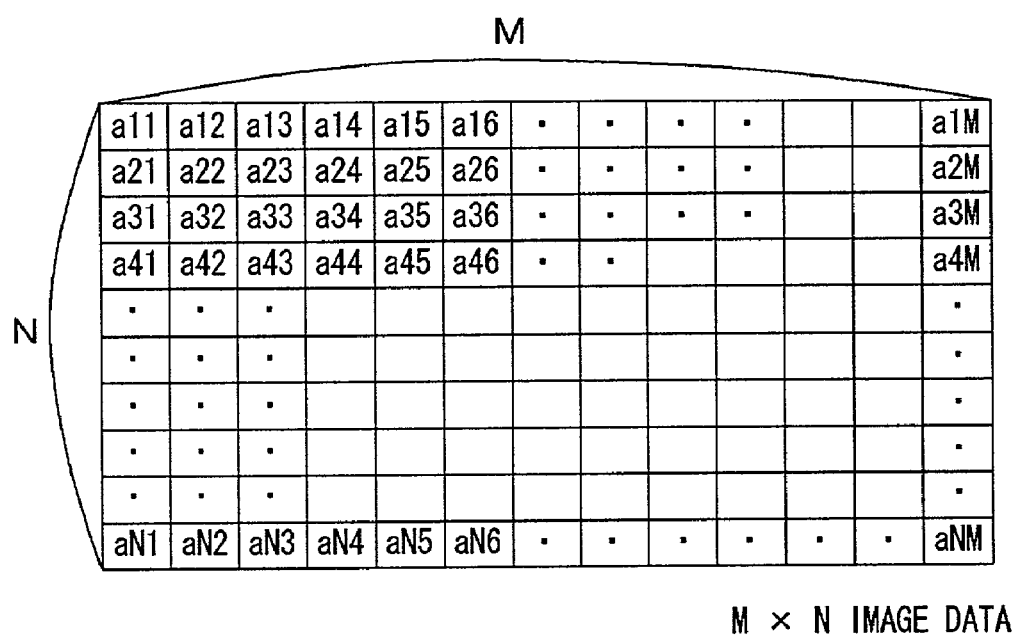
M × N IMAGE DATA

PROCESSED WITH 200-PIXEL EXTENSION

PROCESSED WITH BOTH
APPROACH AGAINST DOT DELAY
AND IMAGE EXTENSION

APPROACH AGAINST DOT DELAY

ORIGINAL IMAGE

PROCESSED BY ERROR DIFFUSION

IMAGE PROCESSING APPARATUS AND METHOD CAPABLE OF ELIMINATING IMAGE CONTOUR DISTORTION

This application is based on application No. 2000-154316 filed in Japan, the content of which is hereby incorporated by reference.

BACKGROUND OF THE INVENTION

1. Field of the Invention

The present invention relates generally to image processing apparatus and methods and recording media having an image processing program recorded therein and particularly to those provided to halftone image data to be processed.

2. Description the Related Art

An image processing apparatus has been conventionally known as providing a halftoning process such as error diffusion. Error diffusion allows an image to be generally reproduced with the tone of an input image while reducing the number of gray levels of dots configuring the image.

FIG. 16 shows a specific example of an image input to an image processing apparatus. As shown in the figure, this image has a square contour, with a density low at the upper left portion and higher as it comes closer to the lower right portion.

FIG. 17 shows a result of processing the FIG. 16 image through error diffusion. As is apparent from FIG. 17, the image has an upper left portion with a contour which should be pointed but in effect rounded. Thus the conventional technique disadvantageously introduces a contour distortion in an image particularly at a portion having a light color.

SUMMARY OF THE INVENTION

The present invention has been made to overcome the aforementioned disadvantage and it contemplates an image processing apparatus, method and program capable of eliminating an image contour distortion.

In order to achieve the above object the present invention in one aspect provides an image processing apparatus including: an extender extending at least one side of first image data outwardly of the first image data by a predetermined amount to produce second image data; a halftoner halftoning the second image data to produce third image data; and an extractor extracting from the third image data a portion corresponding to the first image data.

The present invention in another aspect provides an image processing apparatus including: an extender extending at least one side of first image data outwardly of the first image data by a predetermined amount to produce second image data; and a halftoner halftoning the second image data and extracting only a portion corresponding to the first image data from the second image data halftoned.

The present invention in still another aspect provides an image processing method comprising the steps of: extending at least one of first image data outwardly of the first image data by a predetermined amount to produce second image data; halftoning the second image data to produce third image data; and extracting from the third image data a portion corresponding to the first image data.

The present invention in still another aspect provides an image processing program executing a method including the steps of: extending at least one side of first image data outwardly of the first image data by a predetermined amount to produce second image data; halftoning the second image data to produce third image data; and extracting from the third image data a portion corresponding to the first image data.

The foregoing and other objects, features, aspects and advantages of the present invention will become more apparent from the following detailed description of the present invention when taken in conjunction with the accompanying drawings.

BRIEF DESCRIPTION OF THE DRAWINGS

In the drawings:

FIG. 2 represents an image to be processed;

DESCRIPTION OF THE PREFERRED EMBODIMENTS

First Embodiment

Figure 1:
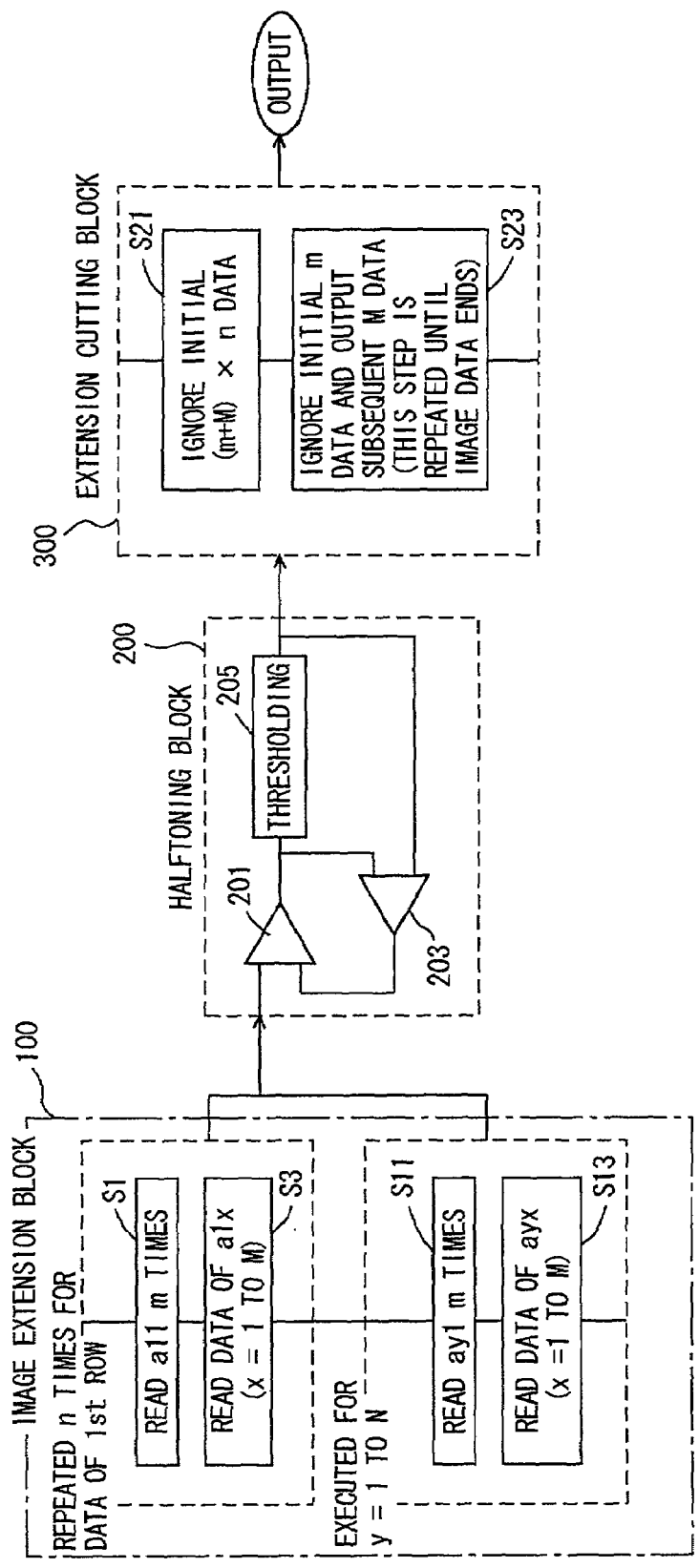
FIG. 1 is a block diagram showing a configuration of an image processing apparatus in a first embodiment of the present invention.

FIG. 1 is a block diagram showing a configuration of an image processing apparatus in a first embodiment of the present invention. With reference to the figure, the image processing apparatus includes an image extension block 100 extending at least a portion of image data input, a halftoning block 200 halftoning the extended image data, and a cutting block 300 cutting off the extension of the image data.

Halftoning block 200 includes a subtracter 201 subtracting an error from the image data of a pixel to be processed (a target pixel), a thresholding block 205 thresholding the output of subtracter 201, and a subtracter 203 subtracting the output of subtracter 201 from the result obtained at thresholding block 205.

FIG. 2 represents image data to be processed by the FIG. 1 image processing apparatus, i.e., input image data. With reference to the figure, the image data is configured of horizontally arranged M pixels multiplied by vertically arranged N pixels. Each pixel has a pixel value represented by $a_{yx}$, wherein y represents a vertical position and x represents a horisontal position.

With reference to FIG. 1, image extension block 100 provides a process of steps S1–S13 to extend an image leftward, upper-leftward and upward.

More specifically, initially at step S1 image data of $a_{11}$ is read m times and thus output, wherein m represents the number of pixels extending the image horizontally.

Then at step S3 data of $a_{1x}$ are successively read, wherein x=1 to M. Steps S1 and S3 are repeated n times, wherein n represents the number of pixels extending the image vertically. Note that preferably m and n are both approximately several tens to approximately one hundred.

Then steps S11 and S13 are repeated for y=1 to n.

At step S11, data of $a_{y1}$ is read m times. At step S13, data of $a_{yx}$ are successively read, wherein x=1 to m.

Figure 3:
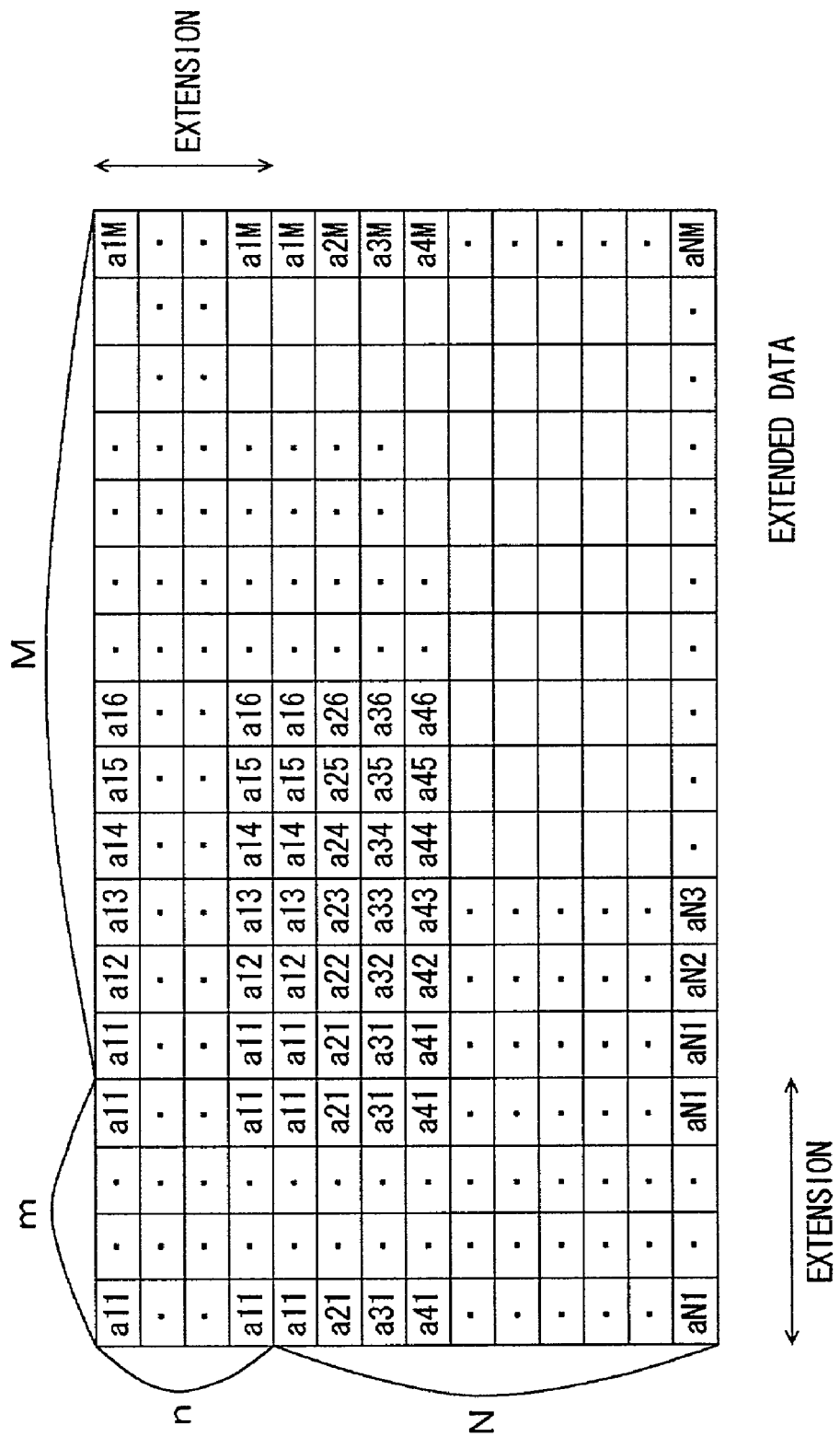
FIG. 3 represents the FIG. 2 image with an extension added thereto.

The FIG. 2 image data thus processed becomes an extended image data, as shown in FIG. 3. More specifically, the FIG. 2 image data has left, upper left and upper portions with new image data added thereto as an extension. The extension contains image data derived from the image data of an end of the input image data, as shown in the figure.

Figure 4:
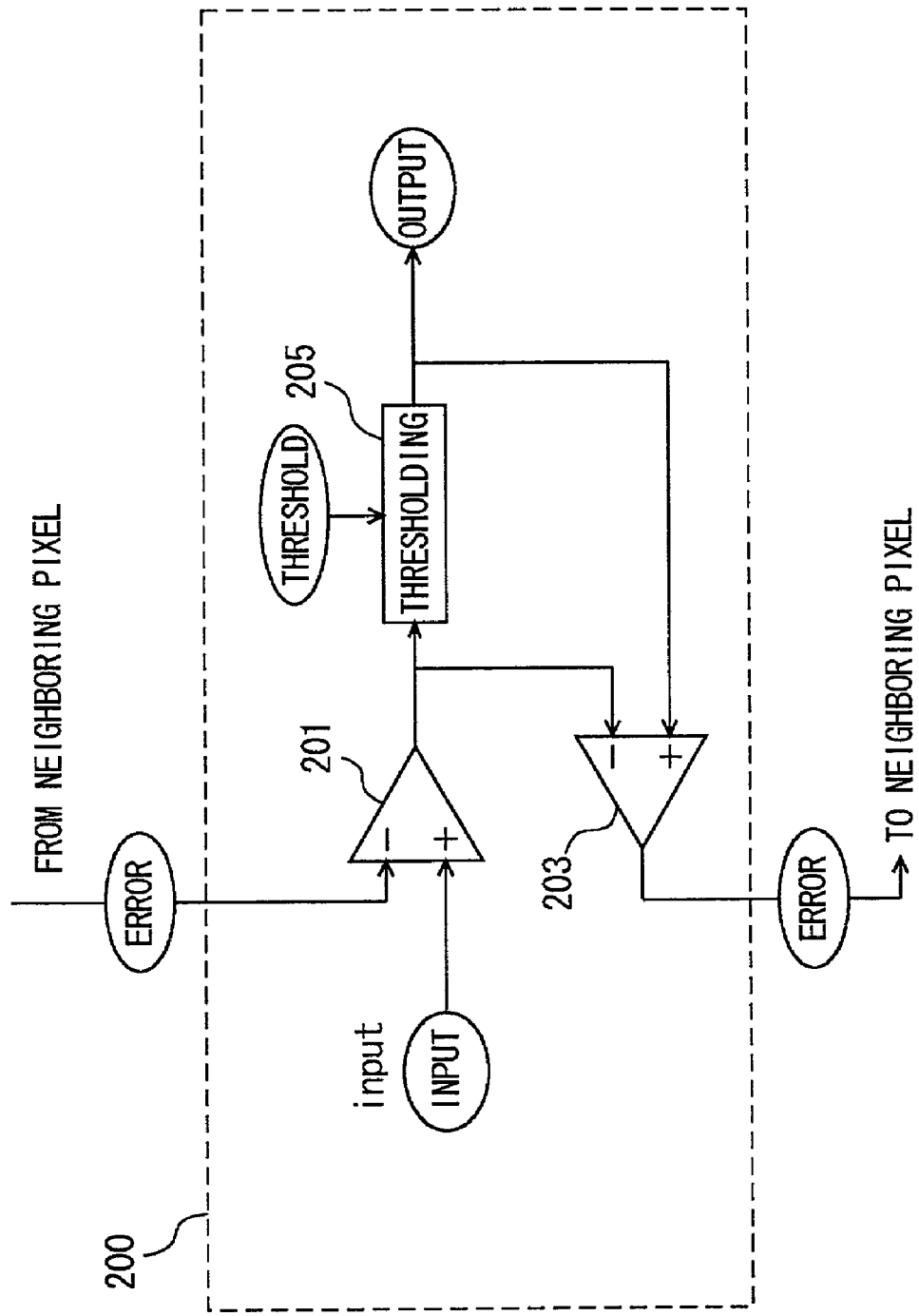
FIG. 4 represents a configuration of the FIG. 1 halftoning block 200.

The image data produced as shown in FIG. 3 is halftoned by the FIG. 1 halftoning block 200. In the present embodiment a halftoning process is provided through such an error diffusion as shown in FIG. 4.

More specifically, subtracter 201 subtracts from input data an error generated from a neighboring pixel and thereon is performed a thresholding operation. The difference between the result of the thresholding operation and the value before it is thresholded is provided as an error and sent to a neighboring pixel.

Figure 5:
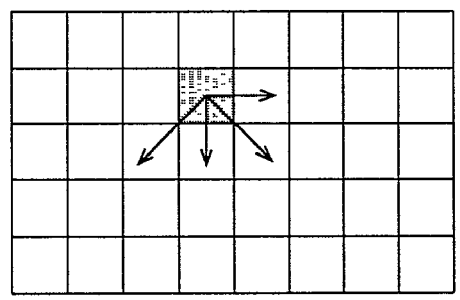
FIG. 5 is an illustration of an error propagation.
Figure 6:
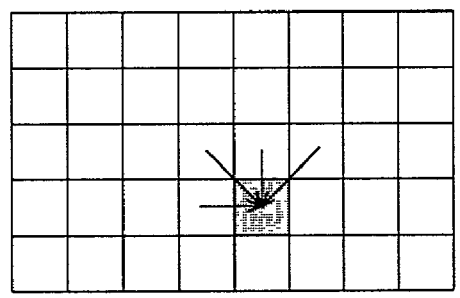
FIG. 6 illustrates an error received by a single pixel.

As shown in FIG. 5, in the present embodiment an error calculated through processing a single pixel is sent to right, lower right, lower and lower left pixels for a total of four pixels. More specifically, as shown in FIG. 6, a single pixel receives errors from upper left, upper, upper right and left pixels for a total of four pixels.

Figure 7:
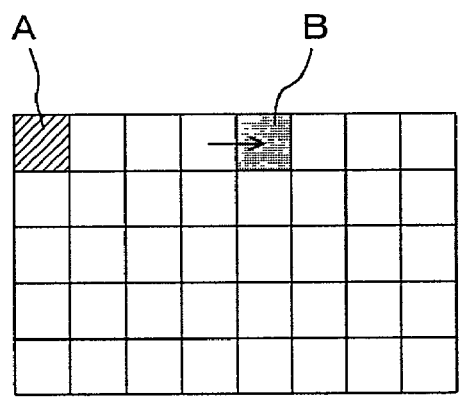
FIG. 7 is a view for illustrating a disadvantage of conventional art.

As such, with reference to FIG. 7, a pixel A, a pixel at which the process starts, does not receive any error from any pixels and a pixel B, a pixel in the uppermost row, only receives an error from a left pixel. Thus in an image pixels at left and upper ends receive an error smaller than should be received, as compared to other pixels. This prevents a normal halftoning process.

Figure 17:
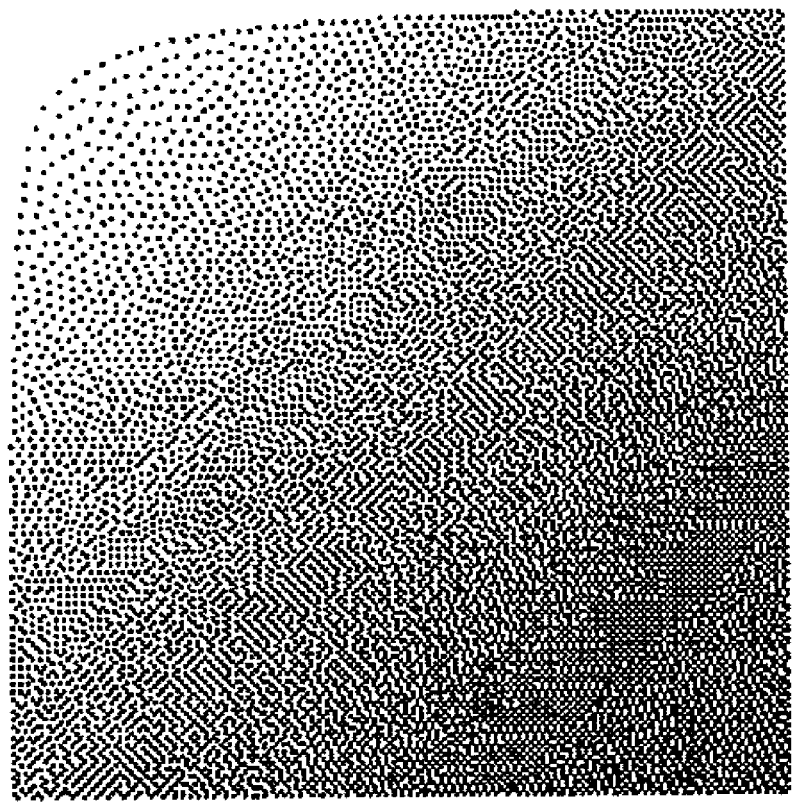
FIG. 17 is a view for illustrating a disadvantage of a process in conventional error diffusion.

Thus, in conventional art, dot generation is delayed for an original image particularly at a portion having a light color, disadvantageously resulting in a contour having a distortion inward, as shown in FIG. 17.

Figure 8:
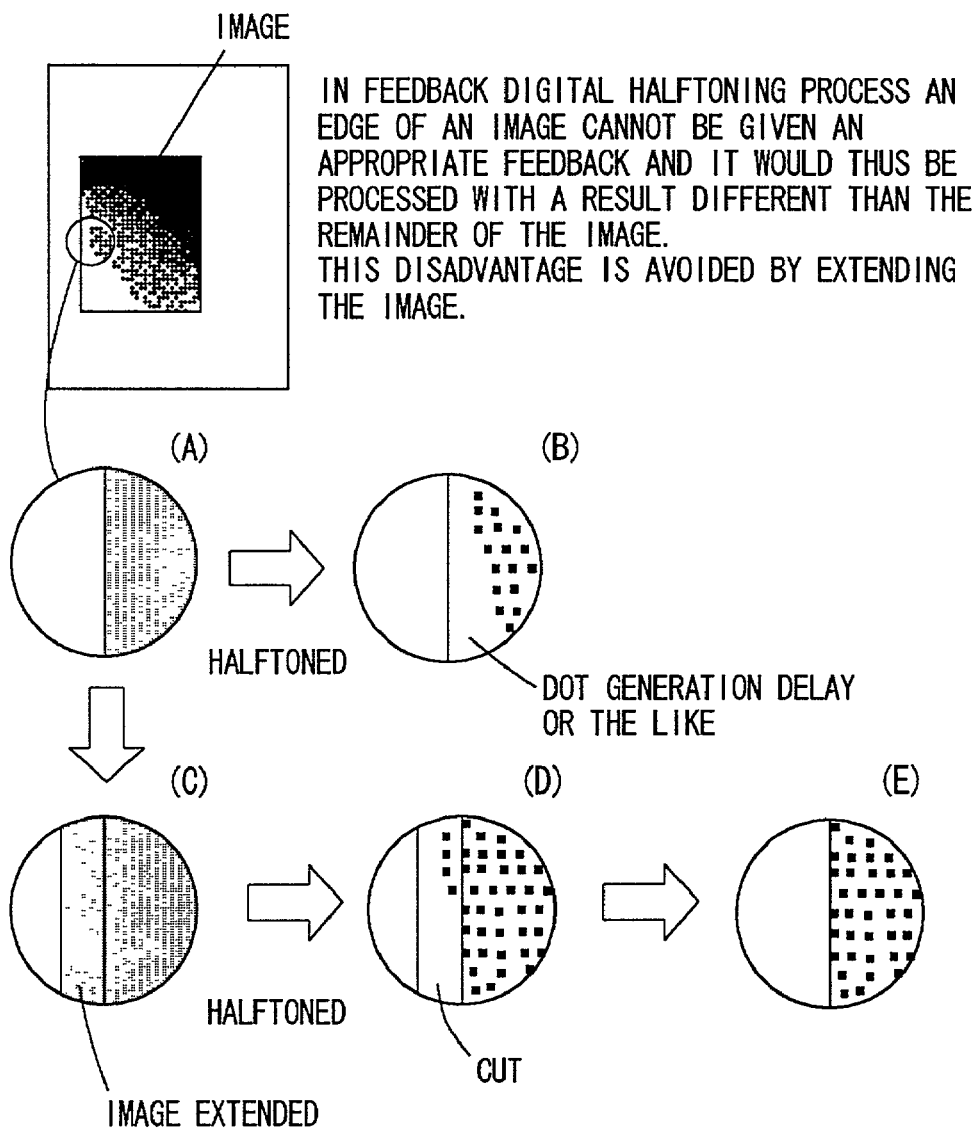
FIG. 8 illustrates a process in the present embodiment.

Accordingly the present invention, as shown in FIG. 8, provides an image processing wherein an original image is partially extended, as shown at (C), and then halftoned as shown at (D) and then has an extension (an unnecessary portion) cut, as shown at (E).

This can prevent a dot generation delay introduced for example when, as shown at (A), an image which is not extended is halftoned, as shown at (B).

The FIG. 1 extension cutting block 300 cuts an image, as described hereinafter.

At the FIG. 1 step S21 initial, (m+M)×n image data are ignored. Then at step S23 initial m image data are ignored and the subsequent M image data are output. Step S23 is repeated until the image data ends.

Figure 9:
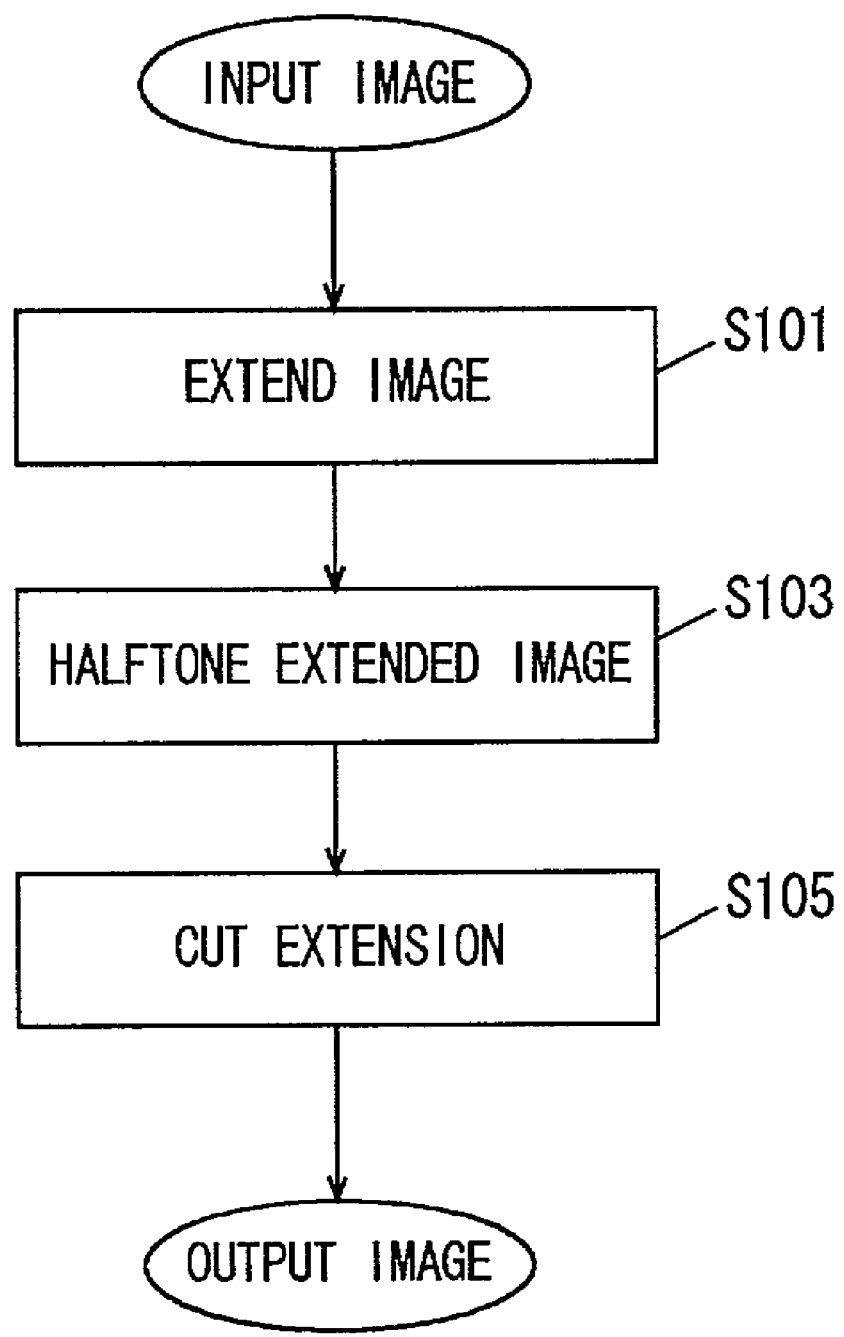
FIG. 9 is a flow chart representing a process in the first embodiment.

FIG. 9 is a flow chart representing an operation of the image processing apparatus in the present embodiment. Note that this flow chart may be executed by a program recorded in a recording medium, such as a CD-ROM, a RAM, a ROM, a hard disk or a floppy disk, as will be described hereinafter.

With reference to FIG. 9, at step S101 an image is extended and at step S103 the extended image is halftoned. Then at step S105 the extension is cut and an image to be output is produced.

Figure 10:
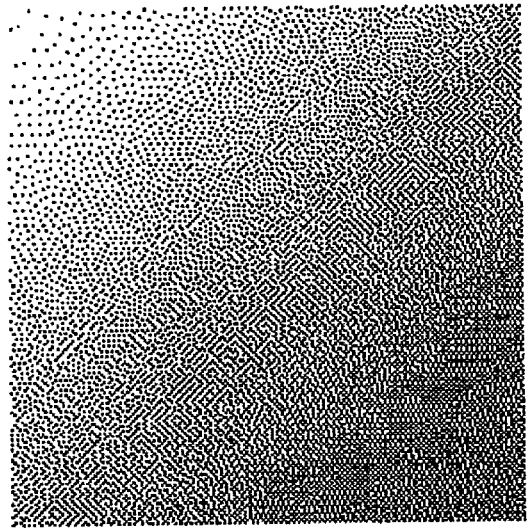
FIG. 10 is a view for illustrating an effect of the first embodiment.
Figure 15:
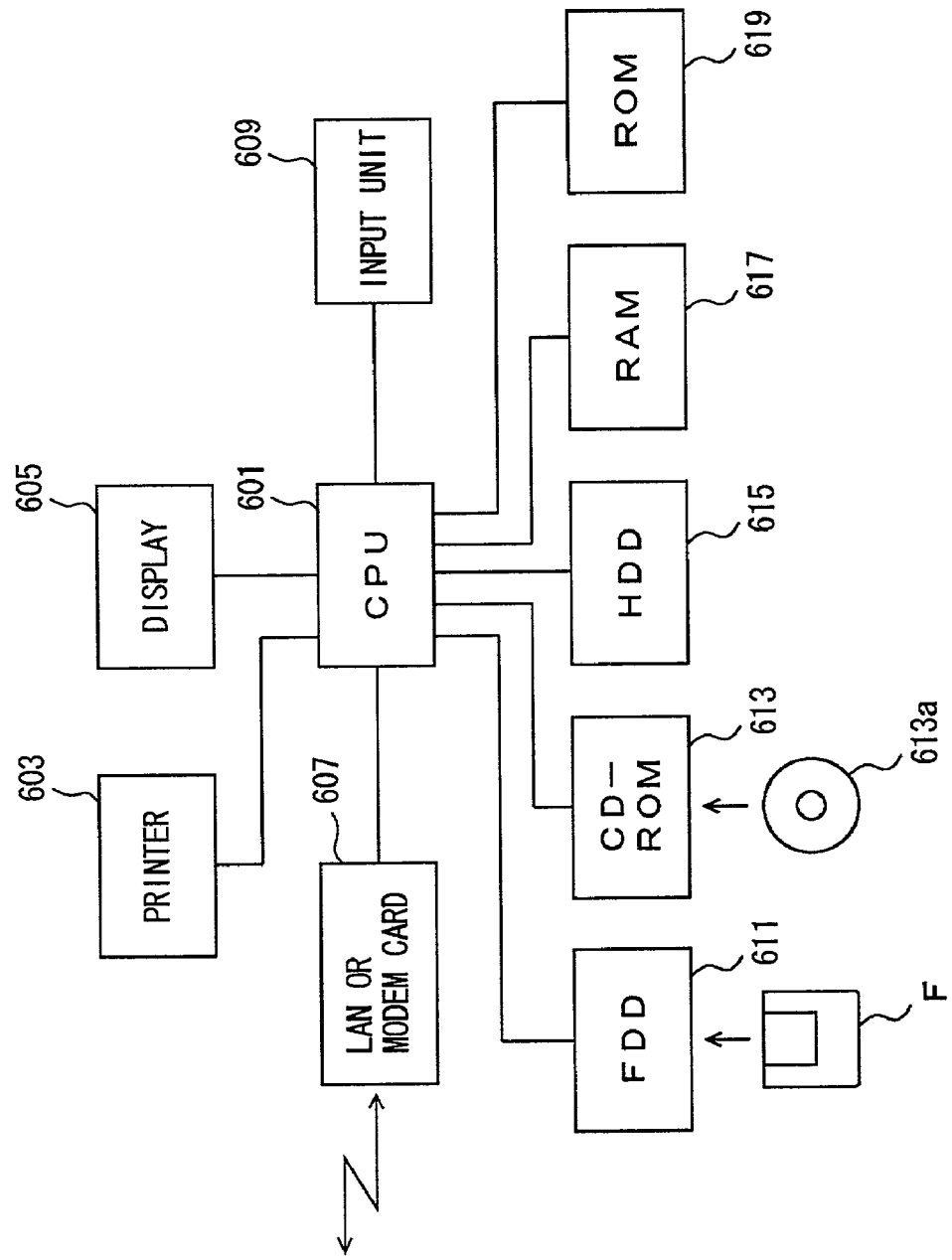
FIG. 15 is a block diagram showing a configuration of a computer executing a program of the present invention.

FIG. 10 shows a result of processing the same image as FIG. 15 in the image processing apparatus of the present embodiment. In the FIG. 10 example, image extension block 100 extends input image data by 200 pixels for the process.

As is apparent from FIG. 10, in the present embodiment such an image contour distortion as shown in FIG. 17 can be eliminated.

Second Embodiment

A second embodiment provides an image processing apparatus having a threshhold value adapted to vary with an input to further alleviate dot delay to output a good image.

Figure 11:
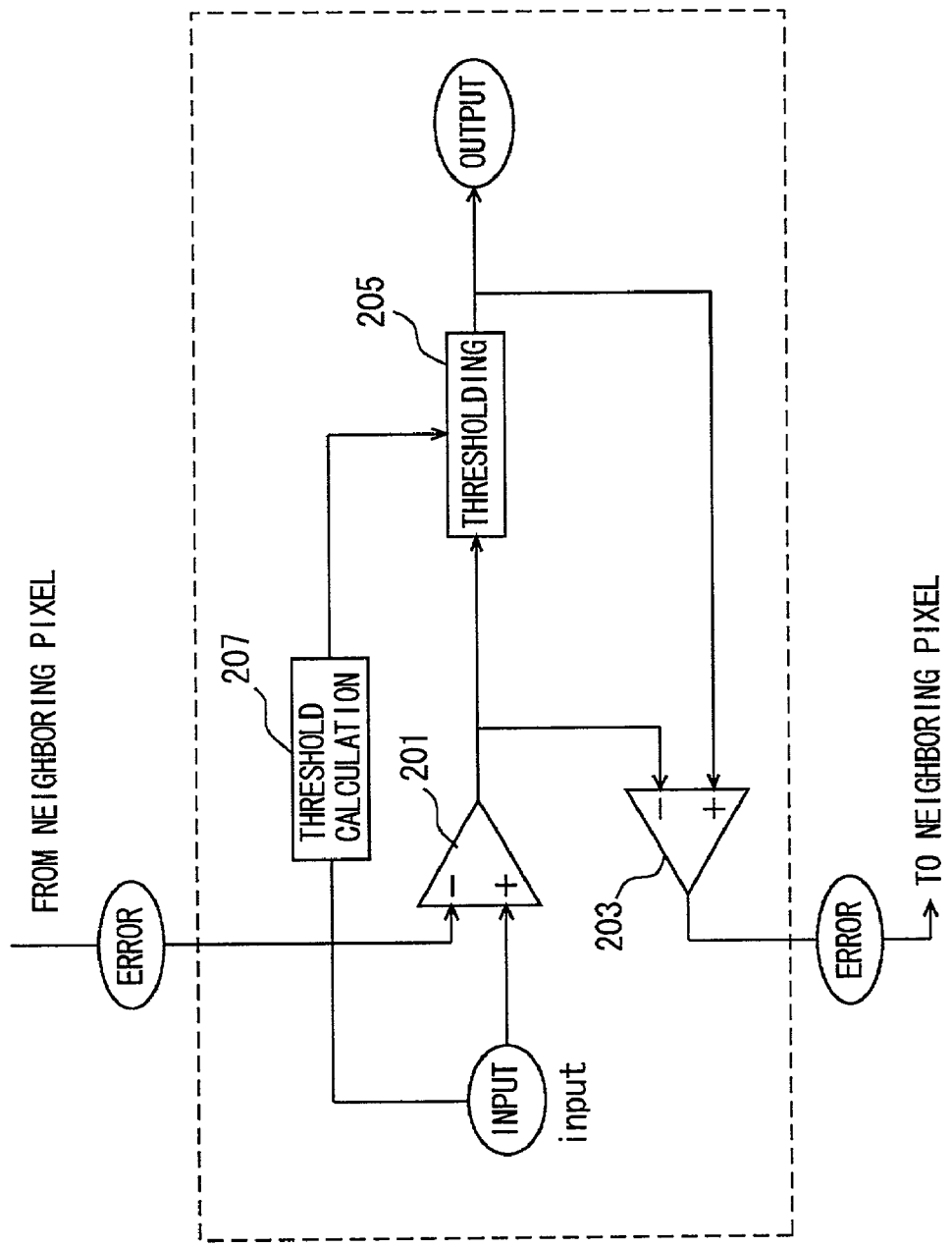
FIG. 11 is a block diagram showing a portion of a configuration of an image processing apparatus in a second embodiment of the present invention.

More specifically in the second embodiment the FIG. 1 halftoning block 200 is replaced by a halftoning block shown in FIG. 11. As shown in FIG. 11, in the present embodiment, an input is referred to by a threshold calculation unit 207 to calculate a threshold value which is in turn used by thresholding block 205 to provide a thresholding operation.

Figure 12:
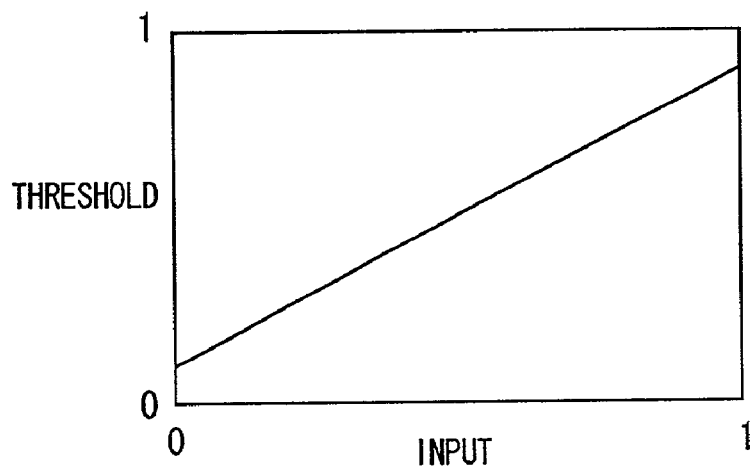
FIG. 12 is a diagram for illustrating a process provided by the FIG. 11 threshold calculation block 207.

FIG. 12 is a diagram for illustrating a threshold value calculated by the FIG. 11 threshold calculation block 207. As shown in the figure, threshold calculation block 207 outputs a threshold value in proportion to an input. More specifically, it outputs a threshold value having a relationship with an input, as represented by the following expression:

$$\text{Threshold value}=0.8\times\text{input}+0.1$$

More specifically, for an input of 0, a threshold value of 0.1 is provided and for an input of 1 a threshold value of 0.9 is provided. With a threshold value varying with an input, dot delay can be alleviated to output a better image.

Figure 13:
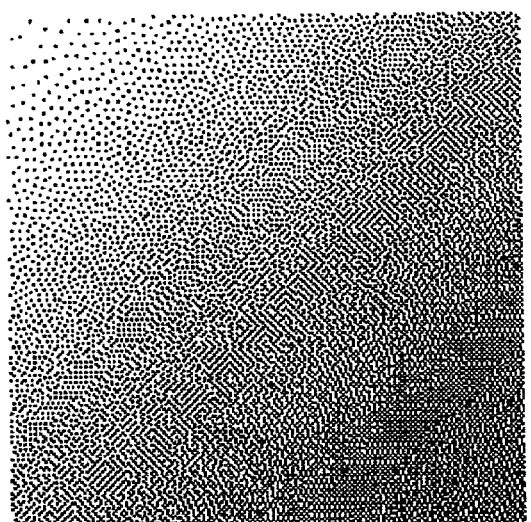
FIG. 13 is a view for illustrating an effect of the second embodiment.

FIG. 13 shows a result of processing an image in the present embodiment with a condition similar to that of the first embodiment as shown in FIG. 10.

Figure 14:
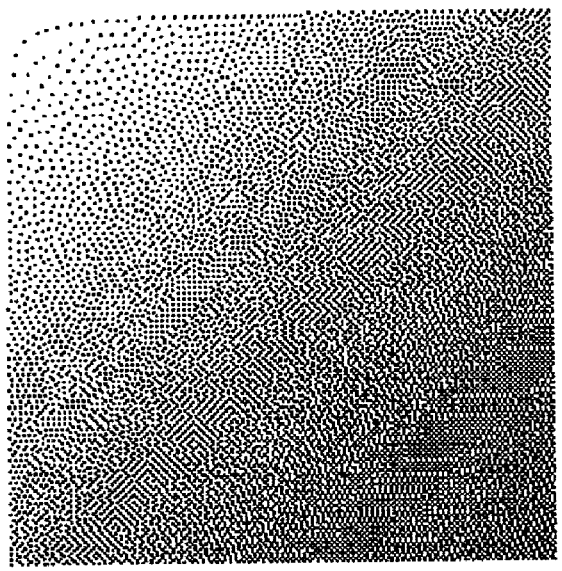
FIG. 14 shows a result of outputting an image when an approach against dot delay is simply taken.
Figure 16:
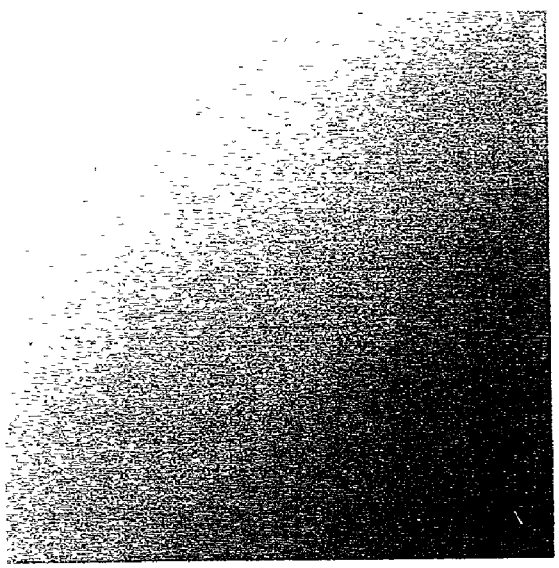
FIG. 16 shows a specific example of image data to be processed.

Furthermore, FIG. 14 shows a result of halftoning an image, as shown in FIG. 11, without extending the image. As is apparent from FIGS. 13 and 14, simply taking an approach against dot delay cannot prevent an image from still disadvantageously having an upper left portion with a distorted contour. By contrast, the approach against dot delay plus the image extension can maintain an image contour in a good condition, as shown in FIG. 13.

Modification

FIG. 15 is a block diagram showing a configuration of a computer executing a program of the present invention.

With reference to the figure, the computer includes a CPU 601 generally controlling the apparatus, a printer 603, a display 605, a local area network (LAN) card or modem card 607 allowing a network connection, an external communication and the like, an input unit 609 configured for example of a keyboard, a mouse and the like, a floppy disk drive 611, a CD-ROM drive 613, a hard disk drive 615, a RAM 617, and a ROM 619.

The program represented in the FIG. 9 flow chart, for driving CPU (a computer) 601, can be recorded in a floppy disk F, a CD-ROM 613a, or a similar recording medium. This program is sent from the recording medium to the RAM or any other recording medium and recorded therein. Note that the program may be recorded in a hard disk, a ROM, a RAM, a memory card or any other similar recording medium and thus provided to a user. Alternatively, it may be downloaded via the Internet from an external site or the like to a work station, a printer or the like and thus executed thereby.

Note that while in the above embodiments a halftoning process is provided through error diffusion, it may alternatively be provided through the threshold diffusion as described in an application disclosing an invention achieved by the present inventors, U.S. application Ser. No. 09/399,180.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An image processing apparatus comprising:
   an extender extending at least one side of first image data outwardly of said first image data by a predetermined amount to produce second image data;
   a halftoner halftoning said second image data to produce third image data; and
   an extractor extracting from said third image data a portion corresponding to said first image data;
   wherein said extension contains image data based on values of pixels in said first image data.

2. The apparatus of claim 1, wherein:
   said halftoner successively thresholds each pixel of an image to be processed; and
   said extender extends said side of said first image corresponding to a side including a pixel to be initially thresholded by said halftoner.

3. The apparatus of claim 1, wherein:
   said extender extends said side corresponding to two adjacent sides of said first image; and
   said extender adds a pixel to successive said two sides outwardly of said first image to provide an image with extensions having their respective images contiguous to each other.

4. The apparatus of claim 3, wherein:
   said halftoner successively thresholds each pixel of an image to be processed; and
   said extender extends said side corresponding to two sides including a pixel to be initially thresholded by said halftoner.

5. The apparatus of claim 1, wherein said extension contains image data based on outermost image data of said first image data and forming an extension of said side of said first image data.

6. The apparatus of claim 1, wherein said extender extends at least ten lines.

7. The apparatus of claim 1, wherein said halftoner comprises a threshold value for thresholding image data input to the halftoner, and the threshold value is adapted to vary according to the image data input to the halftoner.

8. An image processing apparatus comprising:
   an extender extending at least one side of first image data outwardly of said first image data by a predetermined amount to produce second image data; and
   a halftoner halftoning said second image data and extracting only a portion corresponding to said first image data from said second image data halftoned;
   wherein said extension contains image data based on values of pixels in said first image data.

9. The apparatus of claim 8, wherein:
   said halftoner successively thresholds each pixel of an image to be processed; and
   said extender extends said side of said first image corresponding to a side including a pixel to be initially thresholded by said halftoner.

10. The apparatus of claim 8, wherein:
    said extender extends said side corresponding to two adjacent sides of said first image; and
    said extender adds a pixel to successive said two sides outwardly of said first image to provide an image with extensions having their respective images contiguous to each other.

11. The apparatus of claim 10, wherein:
    said halftoner successively thresholds each pixel of an image to be processed; and
    said extender extends said side corresponding to two sides including a pixel to be initially thresholded by said halftoner.

12. The apparatus of claim 8, wherein said extension contains image data based on outermost image data of said first image data and forming an extension of said side of said first image data.

13. An image processing method comprising the steps of:
    extending at least one of first image data outwardly of said first image data by a predetermined amount to produce second image data;
    halftoning said second image data to produce third image data; and
    extracting from said third image data a portion corresponding to said first image data;
    wherein said extension contains image data based on values of pixels in said first image data.

14. The method of claim 13, wherein:
    the step of halftoning includes successively thresholding each pixel of an image to be processed; and
    said side of said first image extended is a side including a pixel to be initially thresholded in the step of halftoning.

15. The method of claim 13, wherein:
    said side extended is two adjacent sides of said first image, said two sides being extended by adding a pixel thereto outwardly of said first image to form extensions having their respective images contiguous to each other.

16. The method of claim 15, wherein:
    the step of halftoning includes successively thresholding each pixel of an image to be processed; and
    said side extended is two sides containing a pixel to be initially thresholded in the step of halftoning.

17. The method of claim 13, wherein said extension contains image data based on outermost image data of said first image data and forming an extension of said side of said first image data.

18. A computer readable medium bearing an image processing program for executing a method comprising the steps of:
    extending at least one side of first image data outwardly of said first image data by a predetermined amount to produce second image data;
    halftoning said second image data to produce third image data; and
    extracting from said third image data a portion corresponding to said first image data;
    wherein said extension contains image data based on values of pixels in said first image data.

19. The computer readable medium of claim 18, wherein:
the step of halftoning includes successively thresholding each pixel of an image to be processed; and
said side of said first image extended is a side including a pixel to be initially thresholded in the step of halftoning.

20. The computer readable medium of claim 18, wherein:
said side extended is two adjacent sides of said first image, said two sides being extended by adding a pixel thereto outwardly of said first image to form extensions having their respective images contiguous to each other.

21. The computer readable medium of claim 18, wherein:
the step of halftoning includes successively thresholding each pixel of an image to be processed; and
said side extended is two sides containing a pixel to be initially thresholded in the step of halftoning.

22. The computer readable medium of claim 18, wherein said extension contains image data based on outermost image data of said first image data and forming an extension of said side of said first image data.

* * * * *